US006879551B2

(12) United States Patent
Kim

(10) Patent No.: US 6,879,551 B2
(45) Date of Patent: Apr. 12, 2005

(54) APPARATUS AND METHOD FOR GENERATING RF SIGNAL AND CONTROL SIGNALS IN OPTICAL DISC SYSTEM

(75) Inventor: Il-kwon Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 402 days.

(21) Appl. No.: 10/080,083

(22) Filed: Feb. 21, 2002

(65) Prior Publication Data

US 2002/0138161 A1 Sep. 26, 2002

(30) Foreign Application Priority Data

Mar. 26, 2001 (KR) ........................................ 2001-15648

(51) Int. Cl.[7] .......................... G11B 7/00; G11B 21/10; G11B 19/18; G05B 19/18
(52) U.S. Cl. ................. 369/44.41; 369/47.2; 369/47.26; 369/47.35; 369/59.16; 369/59.19; 369/59.21
(58) Field of Search ............................. 369/44.41, 47.2, 369/47.25, 47.26, 59.17, 59.19, 59.15, 59.16, 59.21

(56) References Cited

U.S. PATENT DOCUMENTS

| | | | | | |
|---|---|---|---|---|---|
| 4,813,031 | A | * | 3/1989 | Bierhoff | 369/44.34 |
| 4,937,440 | A | * | 6/1990 | Hofer et al. | 250/201.5 |
| 5,142,520 | A | * | 8/1992 | Yanagi et al. | 369/44.29 |
| 5,448,544 | A | * | 9/1995 | Tsuchinaga et al. | 369/53.35 |
| 5,663,945 | A | * | 9/1997 | Hayashi et al. | 369/47.35 |
| 5,986,999 | A | * | 11/1999 | Takahashi | 369/44.29 |
| 6,009,067 | A | * | 12/1999 | Hayashi | 369/47.26 |
| 6,084,836 | A | * | 7/2000 | Kamiyama | 369/44.41 |
| 6,236,628 | B1 | * | 5/2001 | Kim | 369/44.41 |

* cited by examiner

Primary Examiner—Hoa T. Nguyen
Assistant Examiner—Peter Vincent Agustin
(74) Attorney, Agent, or Firm—Mills & Onello, LLP

(57) ABSTRACT

An apparatus and method for generating a radio frequency (RF) signal and control signals are provided. In an apparatus for generating a radio frequency (RF) signal and control signals in which the current output from a plurality of light receiving elements is converted into voltage signals and the RF signal and the control signals are generated in response to the voltage signals, the apparatus includes an input data processing unit, a digital filter, a servo signal generating unit, a digital RF data generating unit, and a reference comparator. The input data processing unit performs time-sharing sampling on the voltage signals and converts the voltage signals into first digital signals in response to an analog/digital conversion clock signal having a predetermined period and a sequentially applied selection signal. The digital filter filters each of the first digital signals to modify the shape of the waveforms of the first digital signals and outputs the modified waveforms as second digital signals. The servo signal generating unit corrects delay time of the second digital signals and generates the control signals for servo control in response to the corrected signals. The digital RF data generating unit corrects delay time of the second digital signals before summing them to generate digital RF data. The reference comparator compares an average value of the digital RF data with the voltage level of the digital RF data in response to a predetermined demodulation clock signal and generates a non-return to zero (NRZ) signal in response to a compared result.

18 Claims, 7 Drawing Sheets

APPARATUS AND METHOD FOR GENERATING RF SIGNAL AND CONTROL SIGNALS IN OPTICAL DISC SYSTEM

BACKGROUND OF THE INVENTION

1. Field of the Invention

The present invention relates to an optical disc system, and more particularly, to an apparatus and method for generating a radio frequency (RF) signal and control signals in an optical disc system.

2. Description of the Related Art

As the information age develops, data transmission speed and the volume of information transmitted progressively increase. One method for storing such information is a magnetic method, which is considered a contact method. Another method is an optical method. However, for convenience and mobility of storage media, an optical storing system is favored over a magnetic disc. In a method for implementing an optical storing system, compact discs (CDs) and digital versatile discs (DVDs) have been developed. In a system for storing or restoring data using an optical disc, the amount of light reflected from the surface of a disc is varied by manipulating the surface of the disc and projecting a laser onto the surface of the disc. In an optical disc restoring system, the quantity of light reflected from the disc is converted into an electrical signal. The electrical signal is then restored into an analog signal having the same intensity. In order to sense the quantity of light reflected from the disc, a photodiode is used as a light receiving element, and the amount of current flowing through the photodiode varies according to the amount of light sensed. Depending on the kind of system, four diodes, referred to as A, B, C, and D, to six photodiodes, referred to as A, B, C, D, E, and F, are typically used.

FIG. 1 is a block diagram of a conventional apparatus for generating a radio frequency (RF) signal and control signals in an optical disc system. The apparatus includes a RF summing & automatic gain control (AGC) unit 100, a RF equalizer 110, a data slicer 120, a phase locked loop (PLL) 130, a tracking error detecting unit 140, a focusing error detecting unit 150, a multiplexer 160, an analog/digital converter (ADC) 170, an ERM & error correction code (ECC) decoder 180, and a servo processing unit 190.

References A0, B0, C0, and D0, which are shown in FIG. 1, denote voltage signals determined by converting the current output from each of the four photodiodes A, B, C, and D into voltage signals. The RF summing & AGC 100 sums the four voltage signals A0, B0, C0, and D0 and amplifies the sum of the four voltage signals to generate an analog RF signal. The analog RF signal is asymmetrically corrected by the RF equalizer 110 and the data slicer 120 and is converted into a square waveform signal consisting of logical 1's and/or 0's by comparing the signal with a predetermined reference voltage, thus restoring data. Also, the focusing error detecting unit 150 and the tracking error detecting unit 140 calculate a time difference and a phase difference between the voltage signals A0 and C0 and between the voltage signals B0 and D0 and determined a focusing error (FE) and a tracking error (TE), respectively.

However, as mentioned above, separate analog circuits such as the RF summing & AGC 100, the tracking error detecting unit 140, and the focusing error detecting unit 150 are used to obtain the RF signal, the focusing error (FE), and the tracking error (TE). Due to this use of separate analog circuits, a controlling method of the system can become complicated. Also, since the RF signal is an analog signal, the RF equalizer 110 and the data slicer 120, which are used for signal correction, are implemented by analog circuits. In the case of using analog circuits, errors can occur during data restoration due to deviations caused by analog elements. Thus, the reliability of the entire system deteriorates. Also, since many analog elements are used, it is difficult to implement an optical disc system with one chip.

SUMMARY OF THE INVENTION

To solve the above problems, it is a first object of the present invention to provide an apparatus for generating a radio frequency (RF) signal and control signals in an optical disc system in which the RF signal and the control signals for servo control in an optical disc system are generated as digital signals, control can be easily performed, and simultaneously, reliability can be increased.

It is a second object of the present invention to provide a method for generating a radio frequency (RF) signal and control signals in an optical disc system in which the RF signal and the control signals for servo control in an optical disc system are generated as digital signals, control can be easily performed, and simultaneously, reliability can be increased.

Accordingly, in accordance with the invention, there is provided an apparatus for generating a radio frequency (RF) signal and control signals in which the current output from each of a plurality of light receiving elements is converted into voltage signals and the RF signal and the control signals are generated in response to the voltage signals. The apparatus includes an input data processing unit for performing time-sharing sampling on the voltage signals and converting the voltage signals into first digital signals in response to an analog/digital conversion clock signal having a predetermined period and a sequentially applied selection signal. A digital filter filters each of the first digital signals to modify the shape of the waveforms of the first digital signals and outputs the modified waveforms as second digital signals. A servo signal generating unit corrects delay time of the second digital signals and generates the control signals for servo control in response to the corrected second digital signals. A digital RF data generating unit corrects delay time of the second digital signals before summing the corrected second digital signals to generate digital RF data. A reference comparator compares an average value of the digital RF data with the voltage level of the digital RF data in response to a predetermined demodulation clock signal and generates a non-return to zero (NRZ) signal in response to a compared result.

In one embodiment, the apparatus of the invention also includes a phase-locked loop (PLL) for generating the analog/digital conversion clock signal having n-times the frequency of the frequency of a channel bit clock signal in response to the digital RF data. A timing generating unit divides the frequency of the analog/digital conversion clock signal n times to generate the demodulation clock signal and count the analog/digital conversion clock signal to generate a selection signal of the multiplexer. The timing generating unit can include a counter which is implemented by a modulo-N counter for generating the selection signal in response to a value to which the analog/digital conversion clock signal is counted and a frequency divider for dividing the frequency of the analog/digital conversion clock signal n times to generate the demodulation clock signal. The counter can be implemented by a modulo-4 counter. The frequency divider can divide the frequency of the analog/digital conversion clock signal four times.

In one embodiment, the input data processing unit includes a multiplexer for sequentially outputting the voltage signals in response to the selection signal. An analog/digital converter (ADC) performs time-sharing sampling output of the multiplexer in response to the analog/digital conversion clock signal and outputs the sampled signals as the digital signals.

In one embodiment, the digital filter can include a plurality of finite impulse response (FIR) filters.

In accordance with the invention, there is also provided a method for generating a radio frequency (RF) signal and control signals in which the current output from a plurality of light receiving elements is converted into voltage signals and the RF signal and the control signals are generated in response to the voltage signals. The method includes the steps of (a) performing time-sharing sampling on the voltage signals and generating first digital signals in response to an analog/digital conversion clock signal having a predetermined period and a sequentially applied selection signal, (b) filtering each of the first digital signals to modify the shape of waveforms of the first digital signals and outputting the modified waveforms as second digital signals, (c) correcting delay time of the second digital signals and generating the control signals including a focusing error and a tracking error in response to the corrected second digital signals, and (d) correcting delay time of the second digital signals and generating the RF signal in response to the corrected second digital signals.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 2:
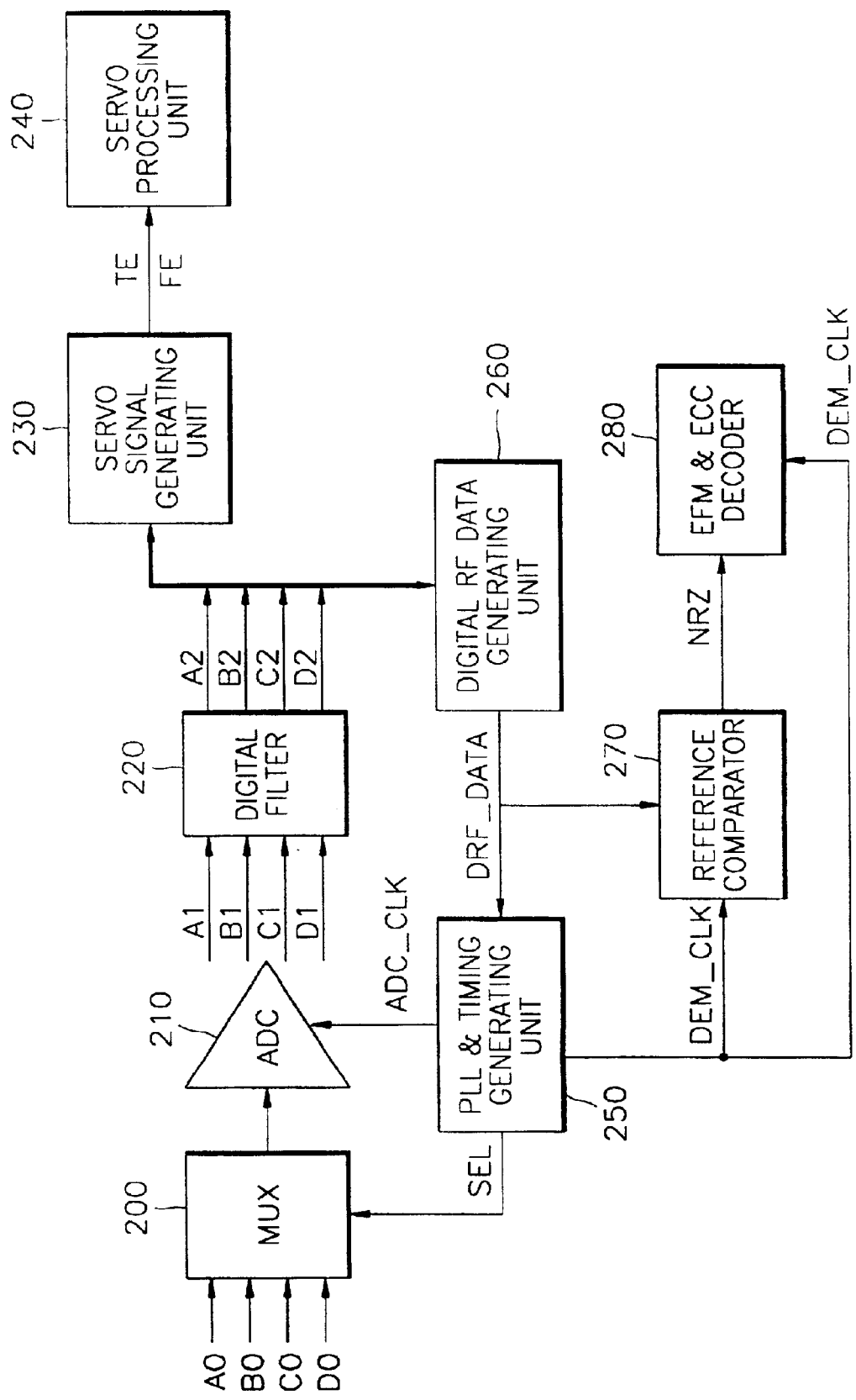
FIG. 2 is a block diagram of an apparatus for generating a RF signal and control signals in an optical disc system according to an embodiment of the present invention.

FIG. 2 is a block diagram of an apparatus for generating a RF signal and control signals in an optical disc system according to a preferred embodiment of the present invention. Referring to FIG. 2, the apparatus for generating a RF signal and control signals in an optical disc system includes a multiplexer 200, an analog/digital converter (ADC) 210, a digital filter 220, a servo signal generating unit 230, a servo processing unit 240, a phase locked loop (PLL) & timing generating unit 250, a digital RF data generating unit 260, a reference comparator 270, and an eight-to-fourteen modulation (EFM) & error correction code (ECC) decoder 280.

A0, B0, C0, and D0 denote voltage signals determined by converting the current output from four light receiving elements, that is, four photodiodes, into voltage signals. Four light receiving elements are used in a preferred embodiment of FIG. 2, but six or more light receiving elements may be used.

The multiplexer 200 sequentially outputs the voltage signals A0, B0, C0, and D0 in response to a selection signal SEL generated in the PLL & timing generating unit 250. Generation of the selection signal SEL will be described in detail below with reference to FIG. 8.

The ADC 210 performs time-sampling on the voltage signals A0, B0, C0, and D0, which are sequentially input through the multiplexer 200, in response to an ADC clock signal ADC_CLK, converts the sampled results into digital signals, and outputs first digital signals A1, B1, C1, and D1. The multiplexer 200 and the ADC 210 may be merged into an input data processing unit.

The digital filter 220 filters the first digital signals A1, B1, C1, and D1, which are input through the ADC 210, to modify the shape of the waveforms of the first digital signals A1, B1, C1, and D1 and outputs the modified waveforms as second digital signals A2, B2, C2, and D2.

The servo signal generating unit 230 inputs the second signals A2, B2, C2, and D2, which are filtered in the digital filter 220, to correct delay time and generates control signals, a focusing error (FE) and a tracking error (TE), for servo control in response to corrected second digital signals. Specifically, the focusing error (FE) and the tracking error (TE) are obtained by a time difference and a phase difference of the second digital signals A2, B2, C2, and D2. The tracking error (TE) and the focusing error (FE) are applied to the servo processing unit 240 and are used to control a tracking servo (not shown) and a focusing servo (not shown), respectively.

The digital RF data generating unit 260 corrects for the delay time of the second digital signals A2, B2, C2, and D2, which are output from the digital filter 220, and then sums the corrected second digital signals A2, B2, C2, and D2, thereby generating together digital RF data DRF_DATA. That is, the time required for light from a light source to reach a pit in a disc is different. For example, light is detected first by photodiodes A and B among all of the photodiodes A, B, C, and D before it is detected by photodiodes C and D. Thus, the servo signal generating unit 230 and the digital RF data generating unit 260 correct for the time difference and minimize errors occurring when the control signals TE and FE and the RF data are generated.

The PLL of the PLL & timing generating unit 250 generates an ADC clock signal ADC_CLK having N-times the frequency of a channel bit clock signal, for example, four-times frequency, in response to the digital RF data DRF_DATA output from the digital RF data generating unit 260. The timing generating unit generates a demodulation clock signal DEM_CLK and the selection signal SEL of the multiplexer 200 in response to the ADC clock signal ADC_CLK. The PLL & timing generating unit 250 will be described in detail with reference to FIG. 8.

The reference comparator 270 inputs the digital RF data DRF_DATA in response to the demodulation clock signal DEM_CLK, which is output from the PLL & timing generating unit 250, and generates a non-return-to-zero NRZ signal for comparing the digital RF data DRF_DATA with a reference voltage.

The EFM & ECC decoder 280 demodulates the NRZ signal, which is generated in the reference comparator 270, in response to the demodulation clock signal DEM_CLK and corrects for errors in the NRZ signal after demodulation.

Figure 3:
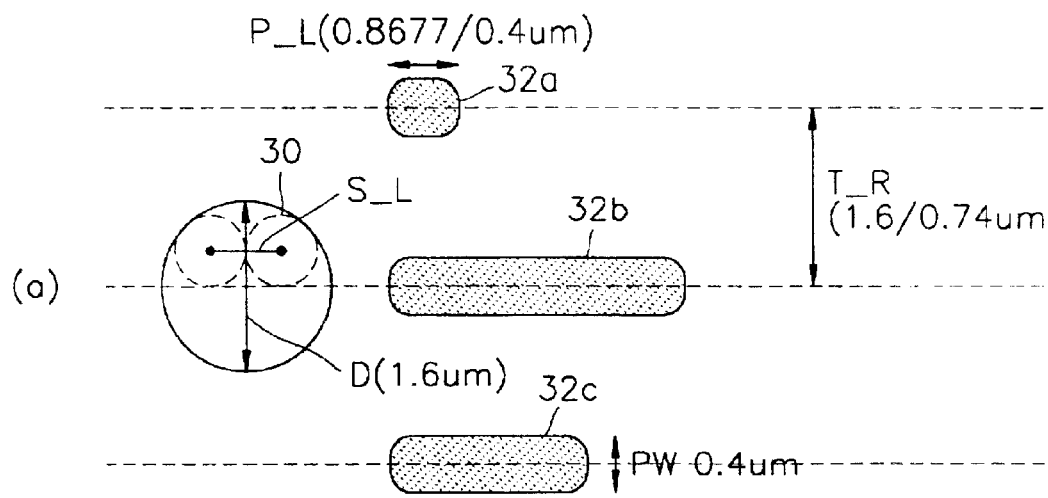
FIG. 3 illustrates the light receiving order of photodiodes according to the standard of an optical pickup and a progressive direction of the apparatus shown in FIG. 2.
Figure 3:
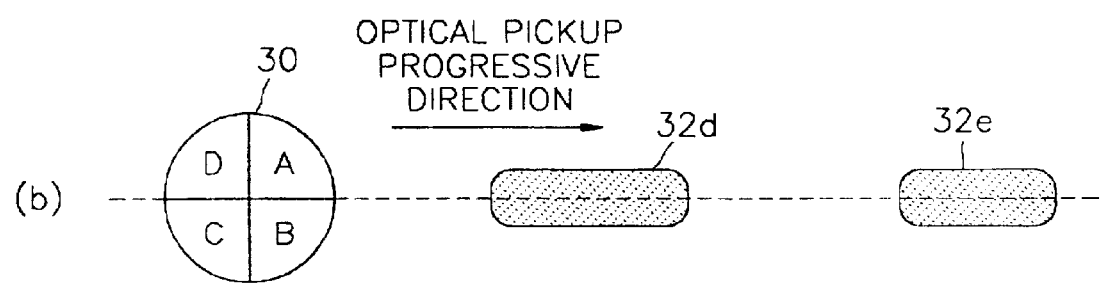

FIGS. 3(a) and 3(b) illustrate the light receiving order of photodiodes according to the standard of an optical pickup and a progressive direction of the apparatus shown in FIG. 2. Reference numerals 30 and 32a through 32e denote the shape of a beam of light received from the four photodiodes A, B, C, and D, and pits in a disc, respectively. Also, D denotes the diameter of the beam (1.6 $\mu$m), P_L denotes the length of the pit, PW denotes the thickness of the pit, and S_L denotes the distance between centers of two photodiodes A and D. T_R denotes the interval between tracks. If the length P_L of a pit is 3T, the length P_L of a pit for a compact disc (CD) is 0.8677 $\mu$m, and the length P_L of a pit for a digital versatile disc (DVD) is 0.4 $\mu$m. Also, the interval between tracks T_R for the CD is 1.6 $\mu$m, and the interval between tracks T_R for the DVD is 0.74 $\mu$m.

In other words, in FIGS. 3(a) and 3(b), the distance S_L between centers of two photodiodes A and D light S_L when the optical pickup is moving in the progressive direction can be indicated by about 1T+a. Here, a denotes the time difference, for example, 3T/4, for sampling A0 and D0 in the ADC 210. As mentioned above, when the optical pickup is moved, light is first detected by photodiodes A and B. Then after a predetermined time, light is detected by photodiodes C and D. The more light there is reflected from the surface of the disc, the more current is allowed to flow. Each of the digital signals output from the ADC 210 can be expressed as A1(n), B1(n), C1(n), D1(n), A1(n+1), B1(n+1), C1(n+1), D1(n+1), . . . , etc. according to a time difference. Thus, data output from the ADC 210 have continuity for each of four samples.

Figure 4:
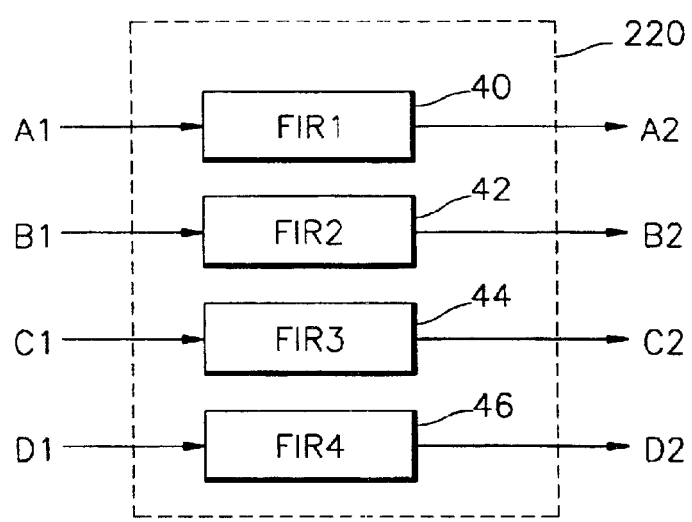
FIG. 4 is a detailed block diagram of a digital filter of the apparatus of FIG. 2.

FIG. 4 is a detailed block diagram of a digital filter 220 of the apparatus of FIG. 2. Referring to FIG. 4, the digital filter 220 includes four finite impulse response (FIR) filters 40, 42, 44, and 46.

Each of the FIR filters 40, 42, 44, and 46 filter first digital signals A1, B1, C1, and D1 to modify the shape of waveforms of the digital signals more precisely and outputs the results as second digital signals A2, B2, C2, and D2. The FIR filters are designed by approximating the frequency response of a discrete time system.

Figure 5:
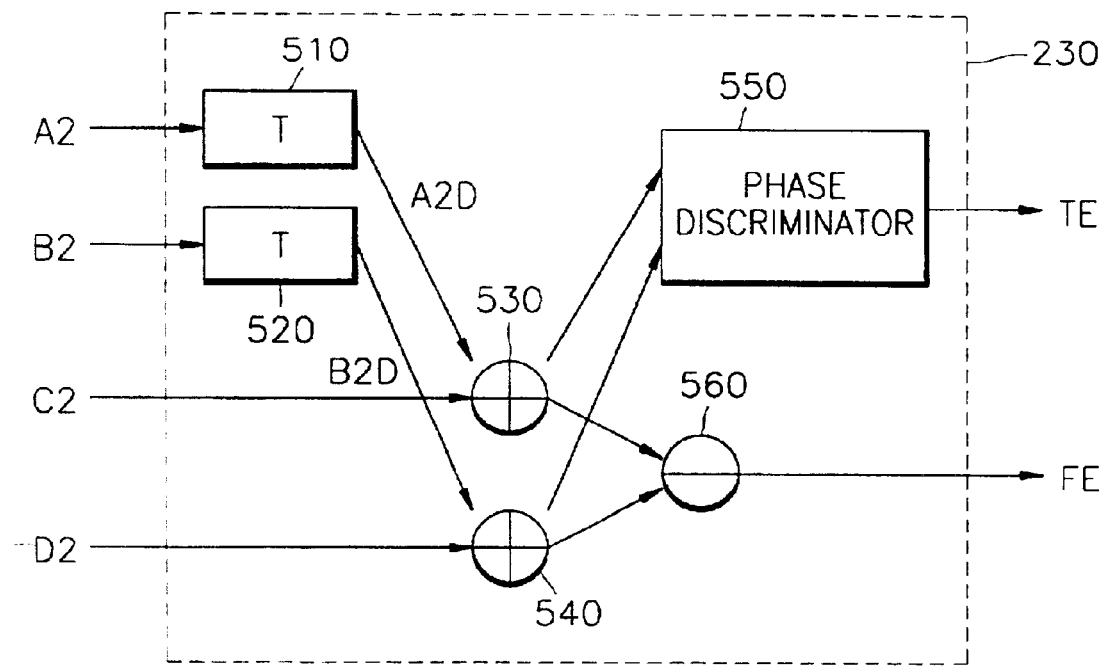
FIG. 5 is a circuit diagram of a servo signal generating unit of the apparatus of FIG. 2.

FIG. 5 is a circuit diagram of a servo signal generating unit 230 of the apparatus of FIG. 2. Referring to FIG. 5, the servo signal generating unit 230 includes first and second delaying units 510 and 520, adders 530 and 540, a phase discriminator 550, and a subtracter 560.

The first delaying unit 510 receives the second digital signal A2, delays the second digital signal A2 by a predetermined time, preferably, a channel bit clock period 1T, and outputs a delayed signal A2D. A channel bit clock signal for a CD has a frequency of 4.3218 MHz, and the channel bit clock signal for a DVD has the frequency of 26.16 MHz. The second delaying unit 520 receives the second digital signal B2, delays the second digital signal B2 by the predetermined time 1T and outputs a delayed signal B2D. The adder 530 adds the delayed digital signal A2D to the second digital signal C2 and outputs the result. The adder 540 adds the delayed digital signal B2D to the second digital signal D2 and outputs the result.

The phase discriminator 550 determines a phase difference of results output from the adders 530 and 540 and generates a tracking error (TE) for controlling a tracking servo (not shown). The subtracter 560 subtracts the result output from the adder 540 from the result output from the adder 530, thereby generating a focusing error (FE) for controlling a focusing servo (not shown).

Since the second digital signals A2, B2, C2, and D2 have continuity for each of four samples, the servo signal generating unit 230 arranges a continuous sample for each of the four samples such as A2(n), A2(n+1), . . . , B2(n), B2(n+1), . . . , C2(n), C2(n+1), . . . , D2(n), D2(n+1), . . . , thereby generating the tracking error (TE) and the focusing error (FE). Here, n+1 denotes delayed data and has the same meaning as delayed signals A2D and B2D of FIG. 5.

Figure 6:
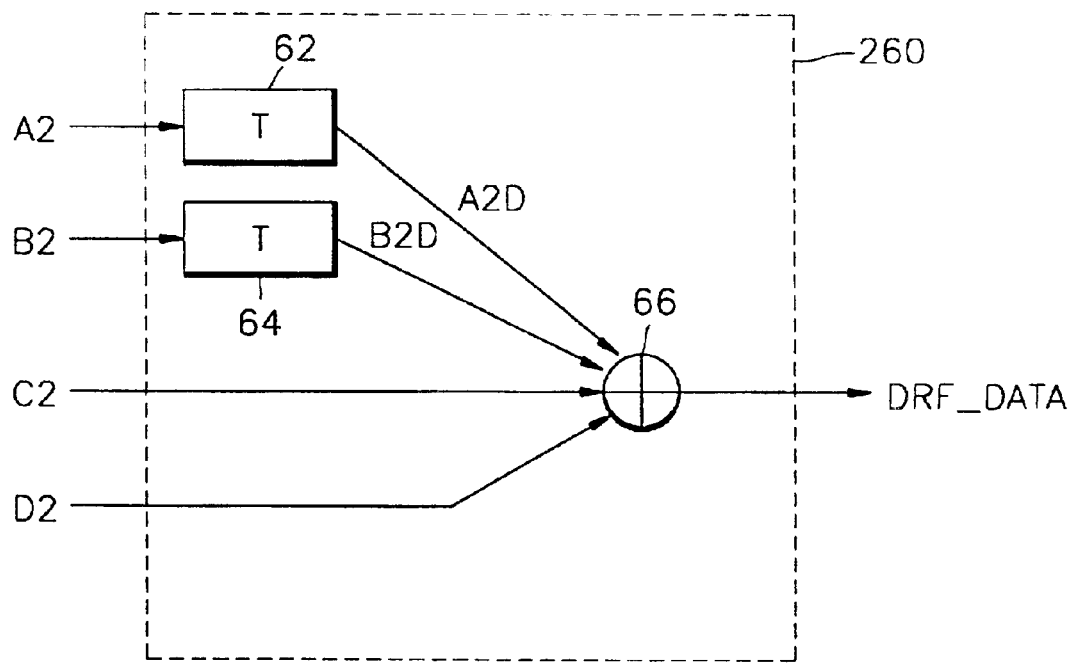
FIG. 6 is a diagram of a digital RF data generating unit of the apparatus of FIG. 2.

FIG. 6 is a diagram of a digital RF data generating unit 260 of the apparatus of FIG. 2. Referring to FIG. 6, the digital RF data generating unit 260 includes first and second delaying units 62 and 64 and an adder 66.

The first and second delaying units 62 and 64 receive second digital signals A2 and B2, delay the second digital signals A2 and B2 by 1T, and output delayed signals A2D and B2D. The adder 66 adds delayed signals A2D and B2D to second digital signals C2 and D2 and outputs the result as the digital RF data DRF_DATA.

The delayed signals A2D and B2D delayed by 1T, are added to the second digital signals C2 and D2, thereby obtaining more precise digital RF data DRF_DATA.

Figure 1:
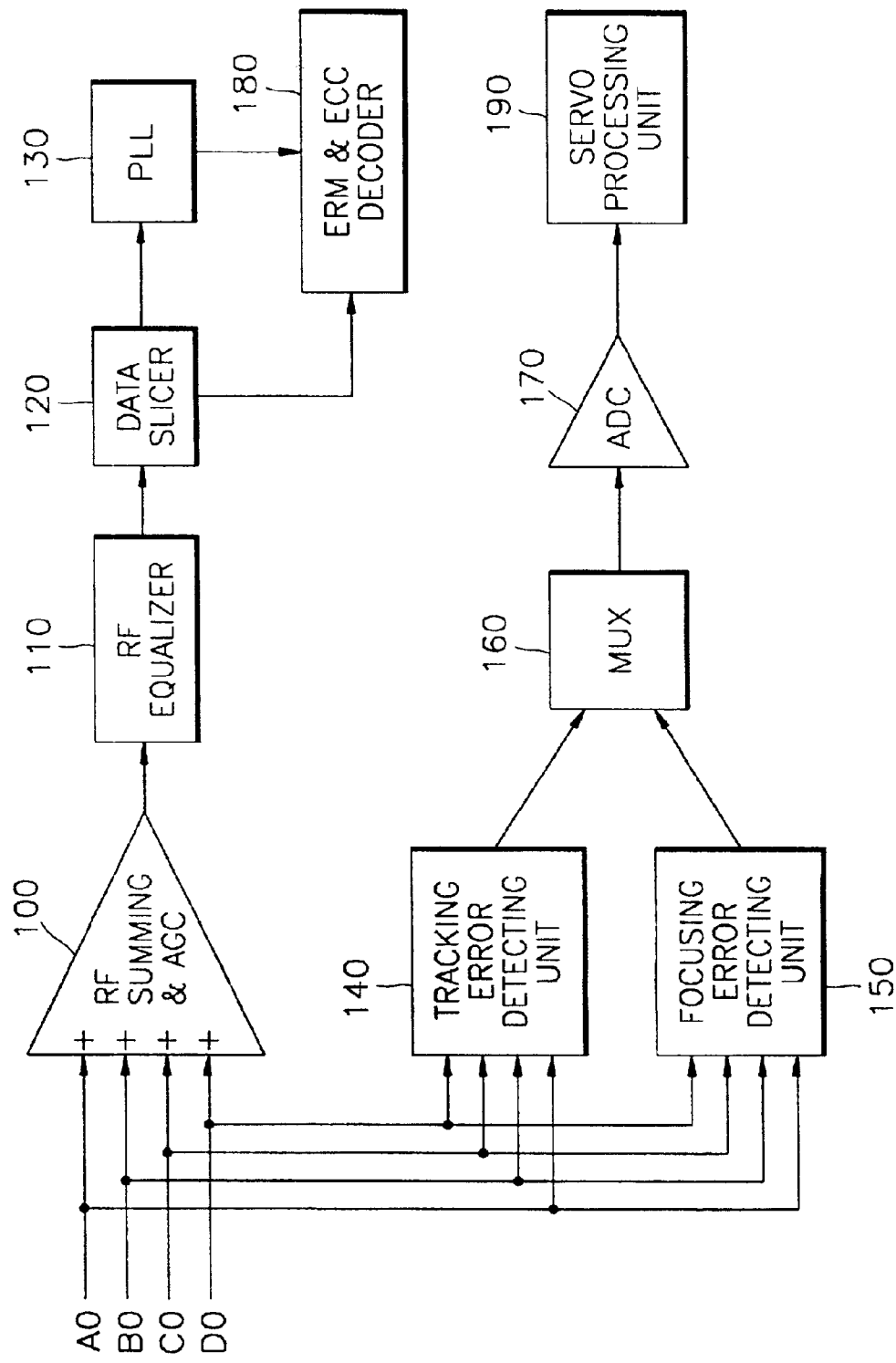
FIG. 1 is a block diagram of a conventional apparatus for generating a radio frequency (RF) signal and control signals in an optical disc system.
Figure 7:
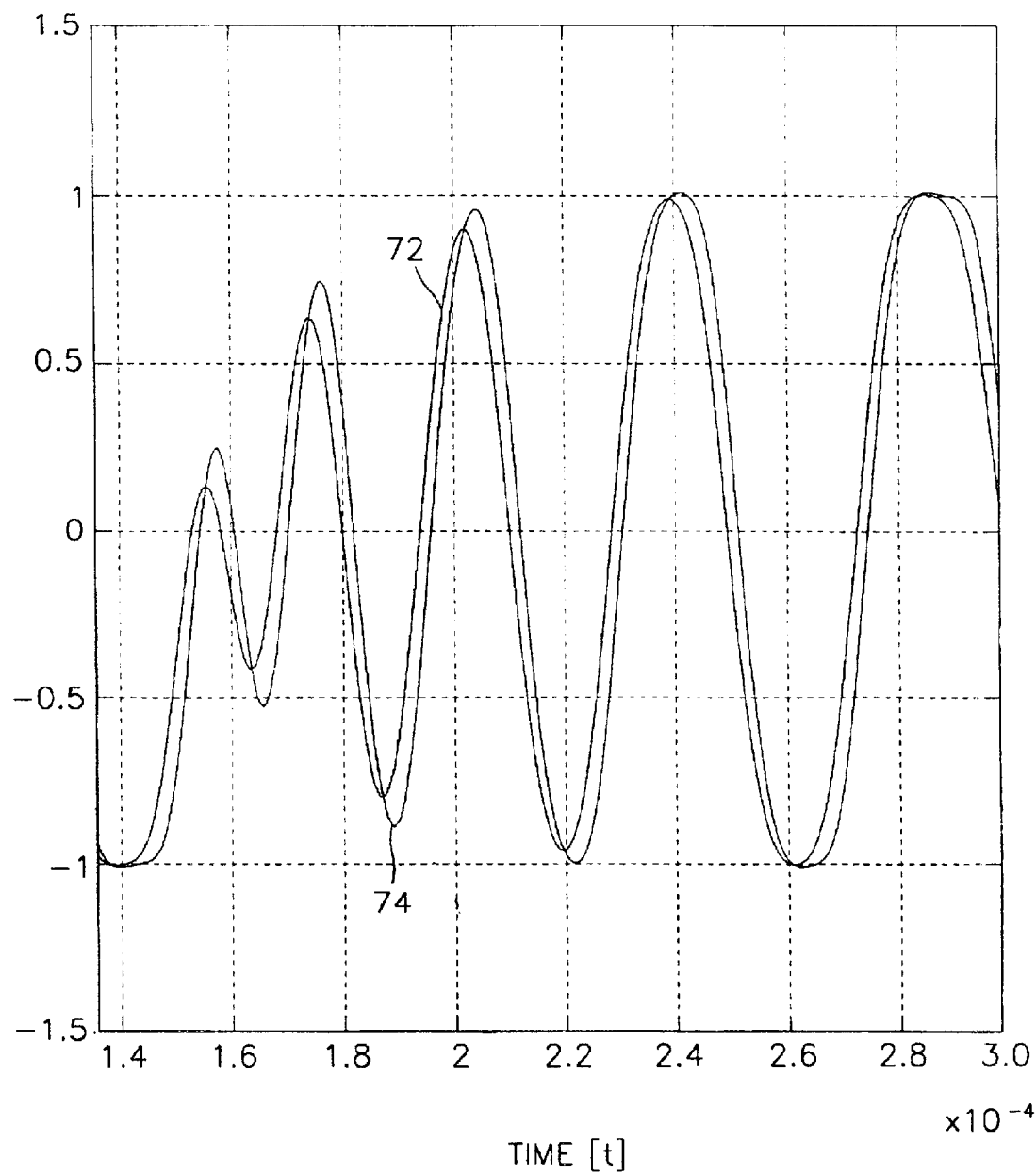
FIG. 7 is a graph comparing RF data according to the present invention with conventional RF data.

FIG. 7 is a diagram for comparing RF data according to the present invention with conventional RF data. Reference numerals 72 and 74 denote conventional RF data generated in a conventional apparatus of FIG. 1 and RF data generated in an apparatus according to the present invention, respectively.

Referring to FIG. 7, the conventional RF data 72 indicate results as A(n)+B(n)+C(n)+D(n), and the RF data 74 generated in the apparatus according to the present invention indicate results as A2(n+1)+B2(n+1)+C2(n+1)+D2(n+1). As shown in FIG. 7, the voltage levels for the RF data 74 is higher than for the RF data 72, and thus the ratio of signal-to-noise (S/N) is increased.

Figure 8:
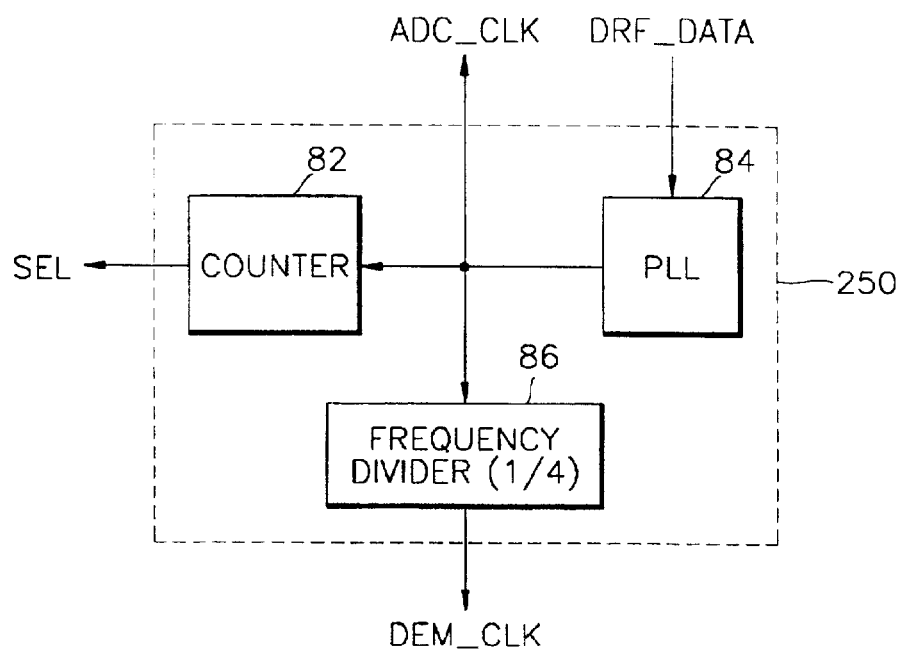
FIG. 8 is a circuit diagram of a phase locked loop (PLL) & timing generating unit of the apparatus of FIG. 2.

FIG. 8 is a circuit diagram of a phase locked loop (PLL) & timing generating unit 250 of the apparatus of FIG. 2. Referring to FIG. 8, the PLL & timing generating unit 250 includes a counter 82, a phase locked loop (PLL) 84, and a frequency divider 86.

The PLL 84 receives the digital RF data DRF_DATA, generates a channel bit clock signal synchronized with the digital RF data DRF_DATA, and generates an ADC clock signal ADC_CLK having n-times the frequency, for example, four-times the frequency, of the channel bit clock signal. The ADC clock signal ADC_CLK is input into the ADC 210 and is used as a sampling clock signal.

The counter 82 counts the ADC clock signal ADC_CLK generated in the PLL 84 and applies the result as the selection signal SEL of the multiplexer 200. The counter 82 may be implemented by a modulo-N counter for performing N (for example, 4) operations. Output from the counter 82 indicates 0, 1, 2, 3 repeatedly. Also, the frequency divider 86 divides the frequency of the ADC clock signal ADC_CLK output from the PLL 84 at a predetermined rate and applies a divided frequency signal as a demodulation clock signal DEM_CLK to the EFM & ECC decoder 280. Preferably, the frequency divider 86 divides the frequency by 4 for the ADC clock signal ADC_CLK output from the PLL 84.

Figure 9:
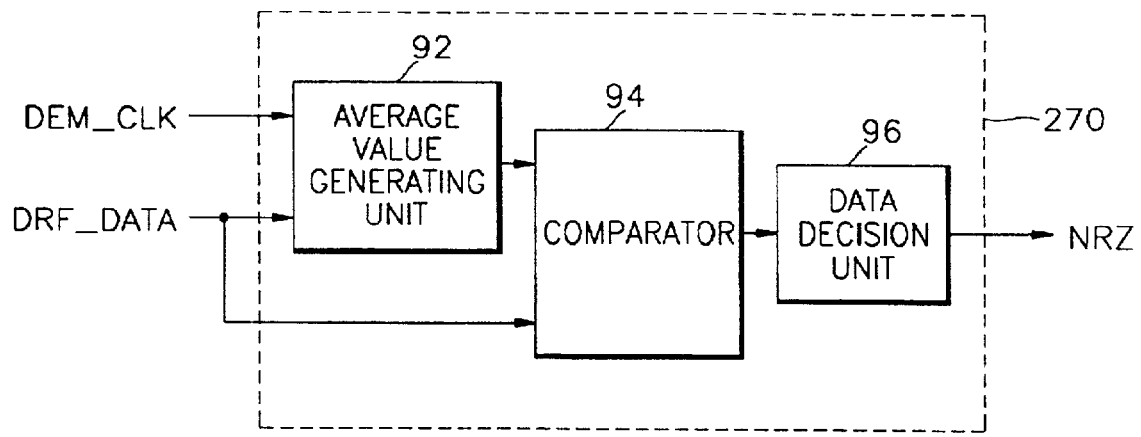
FIG. 9 is a circuit diagram of a reference comparator of the apparatus of FIG. 2.

FIG. 9 is a circuit diagram of a reference comparator of the apparatus of FIG. 2. Referring to FIG. 9, the reference comparator 270 includes an average value generating unit 92, a comparator 94, and a data decision unit 96.

The average value generating unit 92 inputs the digital RF data DRF_DATA, obtains an average value, and sets the average value to a reference voltage.

The comparator 94 compares the reference voltage obtained in the average value generating unit 92 with a voltage level of the digital RF data DRF_DATA and outputs the result. The comparator 94 outputs a signal at a high level, that is, at "1" when the voltage level of the digital RF data DRF_DATA is larger than that of the reference voltage, and outputs a signal at a low level, that is, at "0", when the voltage level of the digital RF data DRF_DATA is smaller than that of the reference voltage.

The data decision unit 96 decides whether the period of an output signal of the comparator 94 exists within a predetermined range and outputs a non-return to zero (NRZ) signal in response to the decided result. The data decision unit 96 has error correction capability for correcting errors occurring due to data output from the comparator 94 at a high level or low level. Specifically, the period of the output signal of the comparator 94 may be outside a predetermined rang, that is, less than 3T. In this case, the data decision unit 96 adjusts the period of the output signal of the comparator 94 into a signal with period greater than 3T and outputs the signal. This is possible using not a conventional analog circuit but a digital circuit. Also, the data decision unit 96 may further include a Viterbi decoder (not shown) to perform error correction. As a result, a signal in which data are corrected by comparing the reference voltage obtained by the average value of the digital RF data DRF_DATA with the voltage level of digital RF data DRF_DATA is an NRZ signal.

Figure 10:
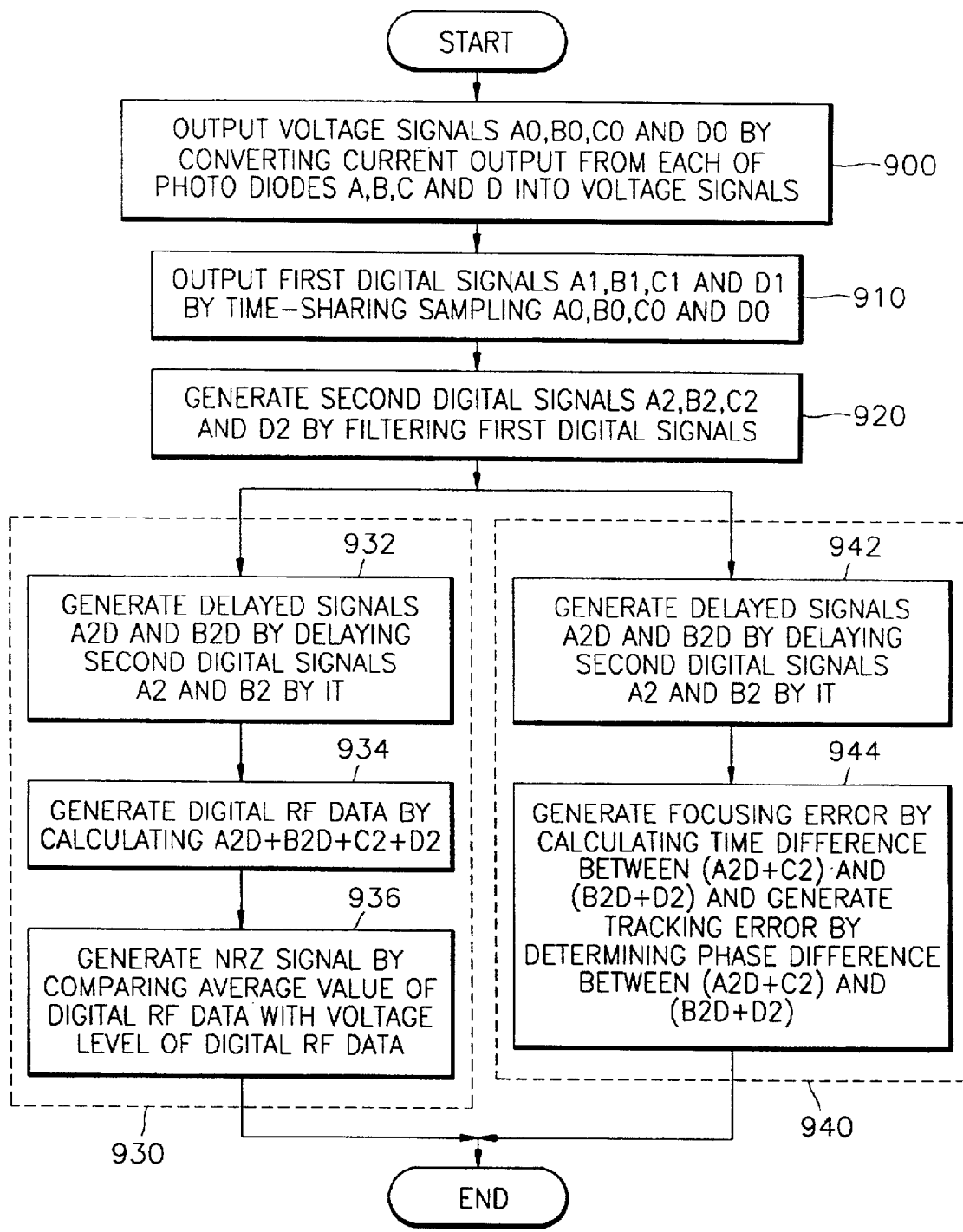
FIG. 10 is a flowchart illustrating a method for generating a RF signal and control signals in an optical disc system according to the preferred embodiment of the present invention.

FIG. 10 is a flowchart illustrating a method for generating a RF signal and control signals in an optical disc system according to the preferred embodiment of the present invention. The method for generating a RF signal and control signals in an optical disc system will be described in detail with reference to FIGS. 2 and 10.

First, current output from each of the photodiodes A, B, C, and D is converted into voltage signals, and converted voltage signals A0, B0, C0, and D0 are output in step 900. Here, voltage signals A0, B0, C0, and D0 are time-sharing sampled in the multiplexer 200 and the ADC 210 of FIG. 2 in response to the selection signal SEL and are output as first digital signals A1, B1, C1, and D1 in response to the ADC clock signal ADC_CLK in step 910. The first digital signals A1, B1, C1, and D1 are filtered in the digital filter 220 of FIG. 2, thereby generating second digital signals A2, B2, C2, and D2 in step 920. Here, the step of obtaining the focusing error (FE) and the tracking error (TE) by the second digital signals in step 940, and the step of obtaining the digital RF data DRF_DATA and the NRZ signal in step 930 are performed. In FIG. 10, steps 930 and 940 are simultaneously performed.

Step 930 will be described in detail as follows. The second digital signals A2 and B2 are delayed by 1T in the digital RF data generating unit 260 and are generated as delayed signals A2D and B2D in step 932, and the digital signals A2D and B2D are added to the second digital signals C2 and D2 (A2D+B2D+C2+D2), thereby generating the digital RF data DRF_DATA in step 934. The digital RF data DRF_ DATA generated in step 934 are input into the reference comparator 270. Thus, the reference comparator 270 compares the average value (reference voltage) of the digital RF data DRF_DATA with the voltage level of digital RF data DRF_DATA and generates the NRZ signal in step 936. The generated NRZ signal is input into the EFM & ECC decoder 280. Here, EFM demodulation and error correction coding are performed, thereby restoring data.

Meanwhile, the second digital signals A2 and B2 generated in step 920 are delayed by 1T in the servo signal generating unit 230 and are generated as delayed signals A2D and B2D in step 942. The servo signal generating unit 230 calculates the time difference between (A2D+C2) and (B2D+D2) to generate the focusing error (FE) and determines a phase difference between (A2D+C2) and (B2D+D2) to generate the tracking error (TE) in step 944. The focusing error (FE) and the tracking error (TE) generated in step 944 are applied to the servo processing unit 240 and are used to control a focusing servo (not shown) and a tracking servo (not shown), respectively.

As described above, precise signals can be generated by using digital circuits instead of analog circuits to generate a RF signal and control signals, and errors can be minimized when the control signals are generated.

According to the present invention, the RF signal and the control signals, which are conventionally generated by separate analog circuits, can be generated by digital circuits, thereby making a system on one chip. Also, since the signals are generated by a digital method, errors occurring due to deviation of analog elements can be minimized. Also, the amount of current flowing into the light receiving elements is fixed by each of the digital filters, thereby modifying the shape of waveforms of the digital signals, and time delay occurring when the RF signal and the control signals are generated is corrected, thereby generating precise signals.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An apparatus for generating a radio frequency (RF) signal and control signals in which the current output from each of a plurality of light receiving elements is converted into voltage signals and the RF signal and the control signals are generated in response to the voltage signals, the apparatus comprising:

an input data processing unit for performing time-sharing sampling on the voltage signals and converting the voltage signals into first digital signals in response to an analog/digital conversion clock signal having a predetermined period and a sequentially applied selection signal;

a digital filter for filtering each of the first digital signals to modify the shape of the waveforms of the first digital signals and outputting the modified waveforms as second digital signals;

a servo signal generating unit for correcting delay time of the second digital signals and generating the control signal for servo control in response to the corrected second digital signals;

a digital RF data generating unit for correcting delay time of the second digital signals before summing the corrected second digital signals to generate digital RF data; and a reference comparator for comparing an average value of the digital RF data with the voltage level of the digital RF data in response to a predetermined demodulation clock signal and generating a non-return to zero (NRZ) signal in response to a compared result.

2. The apparatus as claimed in claim 1, further comprising:
a phase locked loop (PLL) for generating the analog/digital conversion clock signal having a frequency that is n-times the frequency of a channel bit clock signal in response to the digital RF data; and
a timing generating unit for dividing the frequency of the analog/digital conversion clock signal n times to generate the demodulation clock signal and counting the analog/digital conversion clock signal to generate a selection signal of the input data processing unit.

3. The apparatus as claimed in claim 2, wherein the timing generating unit includes a counter which is implemented by a modulo-N counter for generating the selection signal in response to a value to which the analog/digital conversion clock signal is counted, and a frequency divider for dividing the frequency of the analog/digital conversion clock signal n times to generate the demodulation clock signal.

4. The apparatus as claimed in claim 3, wherein the counter is implemented by a modulo-4 counter.

5. The apparatus as claimed in claim 3, wherein the frequency divider divides the frequency of the analog/digital conversion clock signal four times.

6. The apparatus as claimed in claim 2, wherein the input data processing unit includes a multiplexer for sequentially outputting the voltage signals in response to the selection signal, and an analog/digital converter (ADC) for performing time-sharing sampling output of the multiplexer in response to the analog/digital conversion clock signal and outputting the sampled signals as the digital signals.

7. The apparatus as claimed in claim 2, wherein the digital filter includes a plurality of finite impulse response (FIR) filters.

8. The apparatus as claimed in claim 2, wherein the servo signal generating unit includes:
a first delaying unit for: (i) delaying a first signal of first through fourth signals, each having a different delay time, by a time 1T, where 1T is a channel bit clock period, in a case where the second digital signals are the first through fourth signals, and (ii) outputting a delayed first signal;
a second delaying unit for delaying a second signal of the first through fourth signals by the time 1T and outputting a delayed second signal;
a first adder for adding the delayed first signal to a third signal and outputting the added result as a first adder output signal;
a second adder for adding the delayed second signal to a fourth signal and outputting the added result as a second adder output signal;
a phase discriminator for determining a phase difference between the first adder output signal and the second adder output signal and generating a tracking error in response to the determined result; and
a subtracter for subtracting the second adder output signal from the first adder output signal and outputting the subtracted result as a focusing error.

9. The apparatus as claimed in claim 8, wherein the digital RF data generating unit includes:
a third delaying unit for delaying the first signal by the time 1T and outputting the delayed first signal;
a fourth delaying unit for delaying the second signal by the time 1T and outputting the delayed second signal; and
a third adder for adding signals output from the third and fourth delaying units to the third signal and the fourth signal and outputting the added result as the digital RF data.

10. The apparatus as claimed in claim 9, wherein the reference comparator includes:
an average value generating unit for receiving the digital RF data in response to the demodulation clock signal and obtaining the average value of the digital RF data to set the average value of a reference voltage;
a comparator for comparing the reference voltage with the digital RF data and outputting the compared result; and
a data decision unit for deciding whether the period of an output signal of the comparator is a signal existing within a predetermined range and outputting the output signal of the comparator as the NRZ signal in response to the decided result.

11. A method for generating a radio frequency (RF) signal and control signals in which the current output from a plurality of light receiving elements is converted into voltage signals and the RF signal and the control signals are generated in response to the voltage signals, the method comprising the steps of:
(a) performing time-sharing sampling on the voltage signals and converting the voltage signals into first digital signals in response to an analog/digital conversion clock signal having a predetermined period and a sequentially applied selection signal;
(b) digitally filtering each of the first digital signals to modify the shape of waveforms of the first digital signals and outputting the modified waveforms as second digital signals;
(c) correcting delay time of the second digital signals and generating the control signals including a focusing error and a tracking error for servo control in response to the corrected second digital signals;
(d) correcting delay time of the second digital signals before summing the corrected digital signals to generate digital RF data; and
(e) comparing an average value of the digital RF data with the voltage level of the digital RF data in response to a predetermined demodulation clock signal and generating a non-return to zero (NRZ) signal in response to a compared result.

12. The method as claimed in claim 11, wherein step (a) includes:
(a1) sequentially outputting the voltage signals in response to the selection signal; and
(a2) sampling the voltage signals sequentially output in response to the analog/digital conversion clock signal, converting the sampled voltage signal into digital signals, and outputting the digital signals.

13. The method as claimed in claim 12, wherein step (c) includes:
(c1) delaying first and second signals having a different delay time by the time 1T, where 1T is a channel bit clock period, and outputting delayed first and second signals, respectively; and
(c2) subtracting the sum of the delayed second signal and a fourth signal from the sum of the delayed first signal and a third signal and generating the focusing error, in the case where the second signals are the first through fourth signals;

determining a phase difference between the sum of the delayed first signal and the third signal and the sum of the delayed second signal and the fourth signal and generating the tracking error in response to the determined result.

14. The method as claimed in claim 13, wherein step (d) includes:

(d1) delaying the first and second signals among the second digital signals having a different delay time, by the time 1T;

(d2) adding the delayed first and second signals to the third and fourth signals and outputting digital RF data; and (d3) comparing an average value of the digital RF data with the digital RF data to generate a non-return to zero (NRZ) signal and outputting the NRZ signal as the digital RF signal.

15. The method as claimed in claim 14, further comprising:

(e) generating a channel bit clock signal synchronized with the digital RF data;

(f) generating a signal having n times the frequency of the channel bit clock signal as the analog/digital conversion clock signal; and (g) counting the analog/digital conversion clock signal and generating the selection signal in response to the counted result.

16. A method for generating a radio frequency (RF) signal and control signals in which the current output from a plurality of light receiving elements is converted into voltage signals and the RF signal and the control signals are generated in response to the voltage signals, the method comprising the steps of:

(a) performing time-sharing sampling on the voltage signals and generating first digital signals in response to an analog/digital conversion clock signal having a predetermined period and a sequentially applied selection signal;

(b) filtering each of the first digital signals to modify the shape of waveforms of the first digital signals and outputting the modified waveforms as second digital signals;

(c) correcting delay time of the second digital signals and generating the control signals including a focusing error and a tracking error in response to the corrected second digital signals; and (d) correcting delay time of the second digital signals and generating the RF signal in response to the corrected second digital signals; wherein: step (a) includes:

(a1) sequentially outputting the voltage signals in response to the selection signal; and (a2) sampling the voltage signals sequentially output in response to the analog/digital conversion clock signal, converting the sampled voltage signal into digital signals, and outputting the digital signals; and step (c) includes:

(c1) delaying first and second signals having a different delay time by the time 1T, where 1T is a channel bit clock period, and outputting delayed first and second signals, respectively; and (c2) subtracting the sum of the delayed second signal and a fourth signal from the sum of the delayed first signal and a third signal and generating the focusing error, in the case where the second signals are the first through fourth signals;

determining a phase difference between the sum of the delayed first signal and the third signal and the sum of the delayed second signal and the fourth signal and generating the tracking error in response to the determined result.

17. The method as claimed in claim 16, wherein step (d) includes:

(d1) delaying the first and second signals among the second digital signals having a different delay time, by the time 1T;

(d2) adding the delayed first and second signals to the third and fourth signals and outputting digital RF data; and (d3) comparing an average value of the digital RF data with the digital RF data to generate a non-return to zero (NRZ) signal and outputting the NRZ signal as the digital RF signal.

18. The method as claimed in claim 17, further comprising:

(e) generating a channel bit clock signal synchronized with the digital RF data;

(f) generating a signal having n times the frequency of the channel bit clock signal as the analog/digital conversion clock signal; and (g) counting the analog/digital conversion clock signal and generating the selection signal in response to the counted result.

* * * * *